Aug. 17, 1965    J. C. CLEAVER    3,200,793
MULTI-CELL HEATING UNIT
Filed Dec. 17, 1962    4 Sheets-Sheet 4

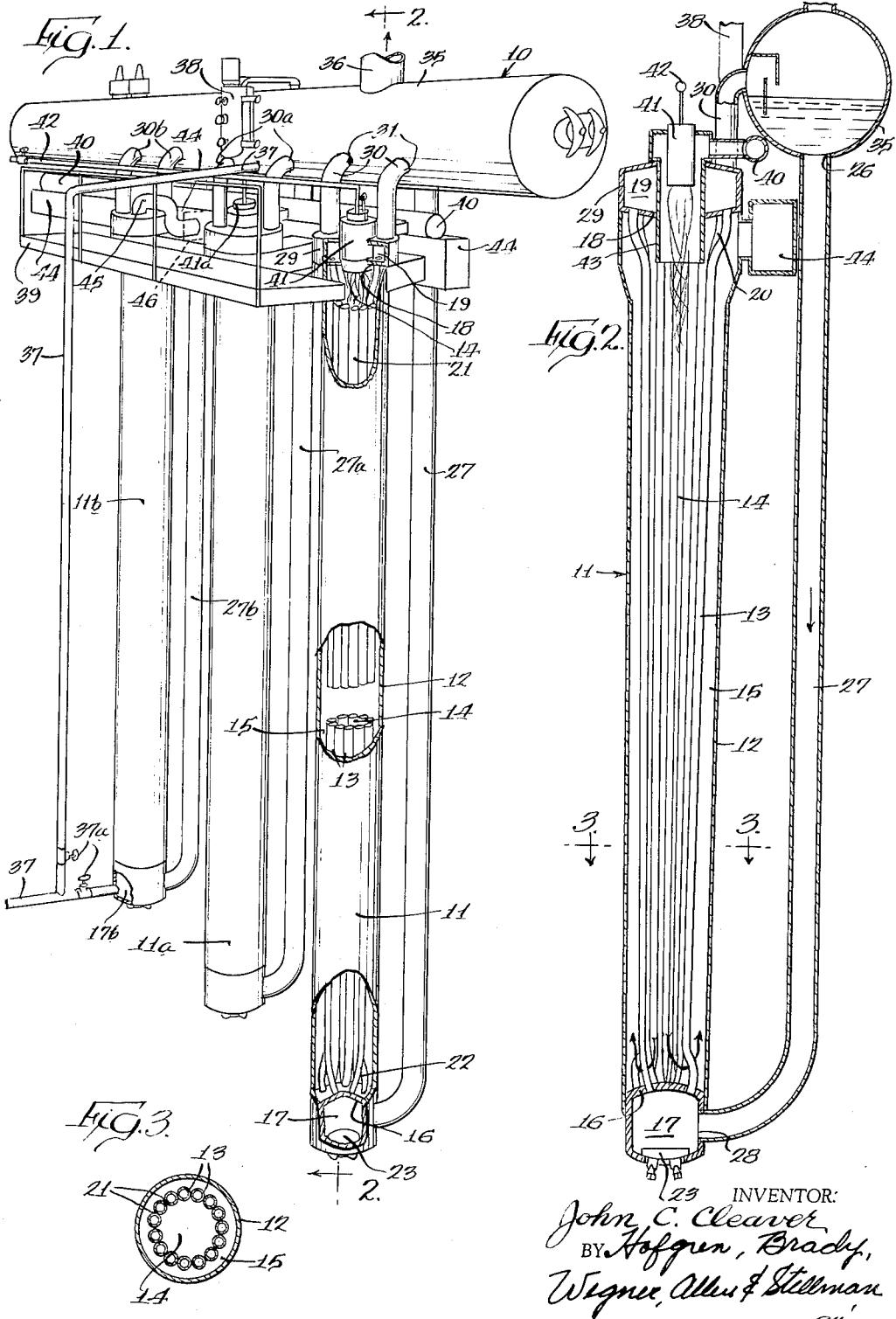

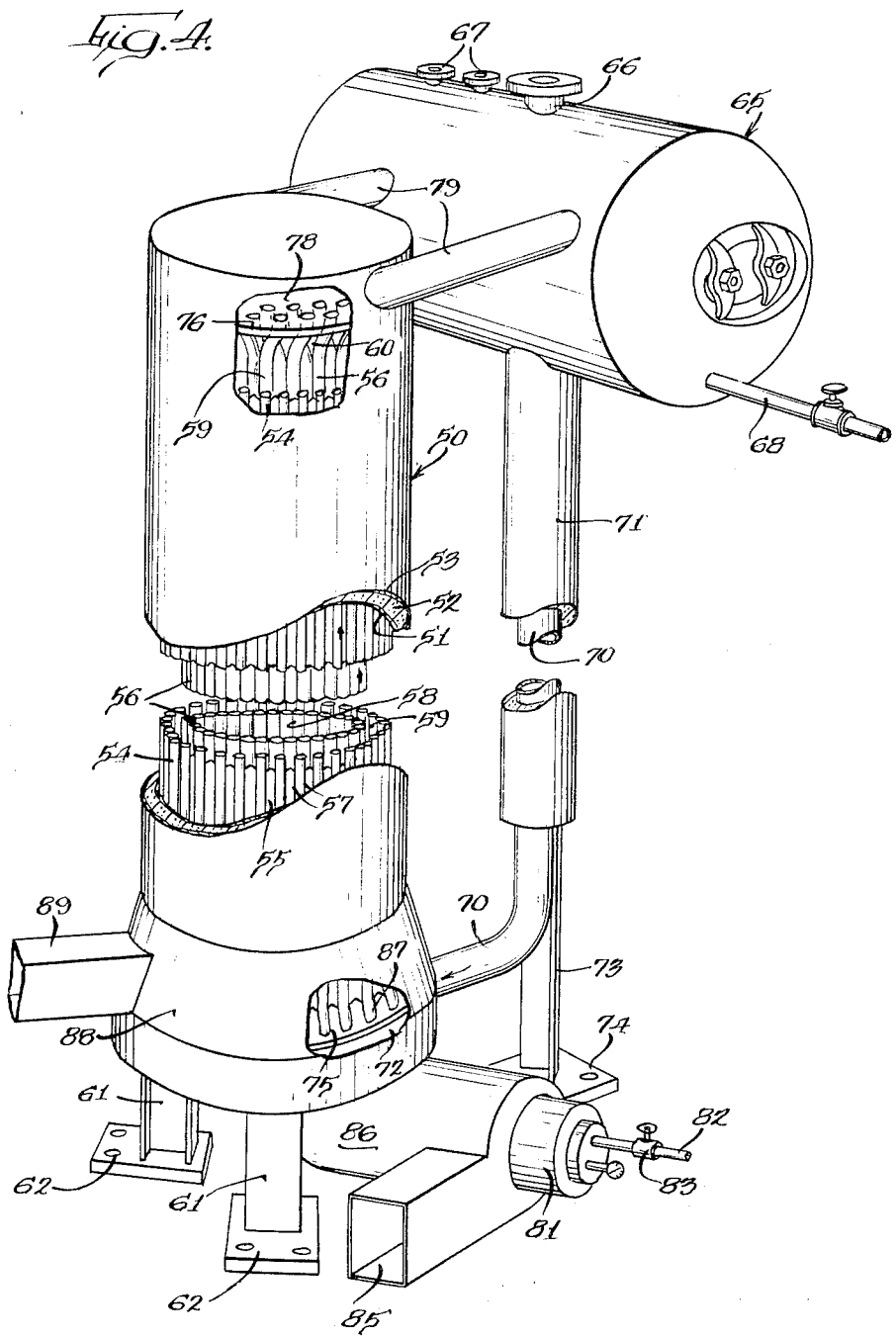

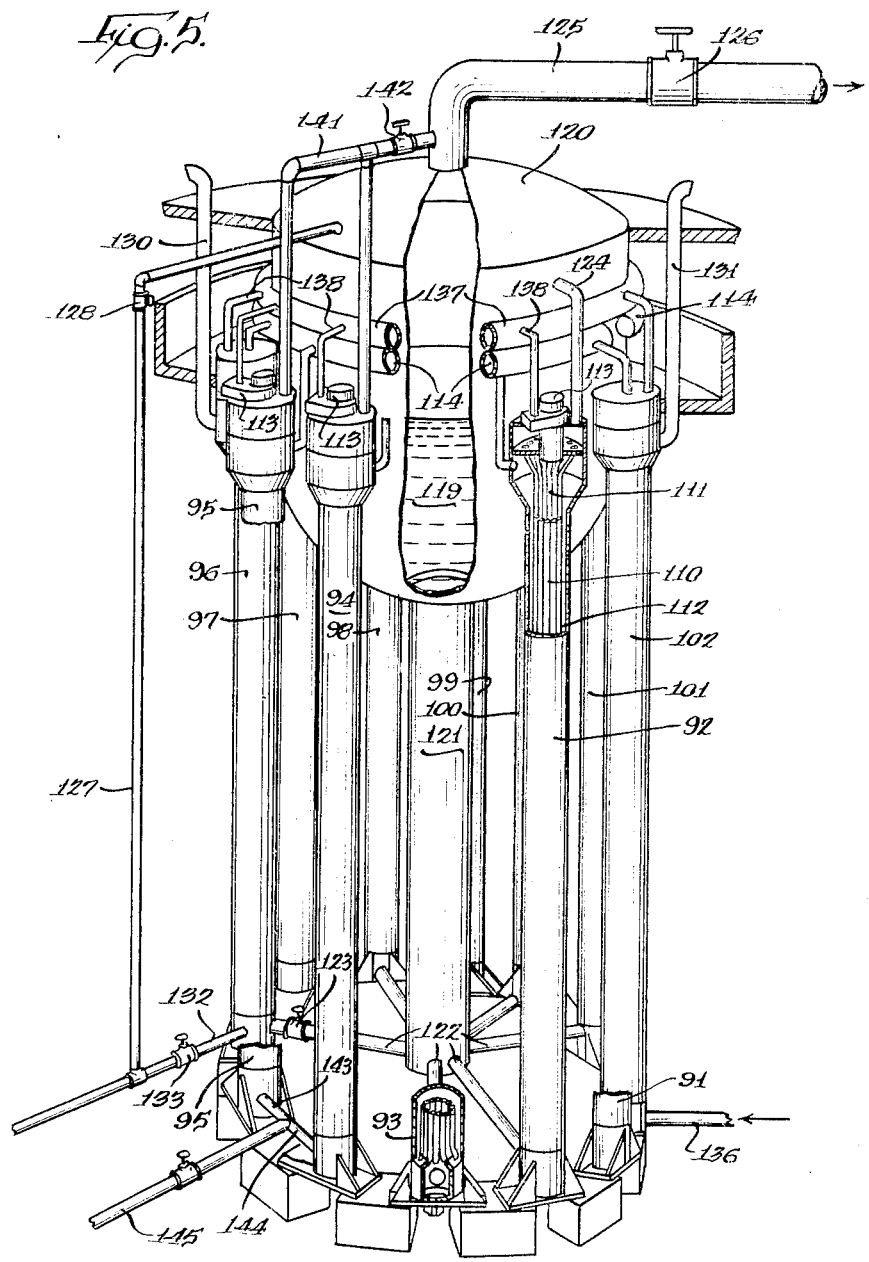

3,200,793
MULTI-CELL HEATING UNIT
John C. Cleaver, Milwaukee, Wis., assignor to Cleaver-Brooks Company, a corporation of Wisconsin
Filed Dec. 17, 1962, Ser. No. 244,967
1 Claim. (Cl. 122—240)

This invention relates to the generation of hot fluids and especially to apparatus for such generation. More particularly this invention relates to hot fluid generator cells and to hot fluid generators utilizing one or more of such cells.

It is a general object of this invention to provide new and useful methods and apparatus for generating hot fluids.

It is also an object of this invention to provide a new and useful assembly of hot fluid generating cells for production of hot fluids such as steam or hot water and also to provide new and useful such cells to be employed in multiple assembly or as individual units for generating hot fluids.

In one particular aspect it is an object to provide a new and useful system or assembly of cells, preferably in parallel water and/or flow, each cell having separate chambers for passage of hot combustion gases therethrough in heat exchange with water or steam or air in uninterrupted upward flow within heat exchanger tubes, the assembly of cells including cells in cyclic flow with a water or steam storage and separator tank adapted for withdrawal of steam or hot water therefrom and wherein the cyclic flow is maintained substantially by convection currents including weight or density differences set up in water or water-steam mixtures within the heat exchange tubes. The system may include an additional cell or additional cells for preheating feed water and burner supply air. In this aspect of the invention, other more specific objects include the disposition of individual cells with respect to each other, e.g. in linear array or annular array, and with respect to the storage and separator tank, their association with each other and with the tank, and the employment of cells adapted to generate, superheat and/or reheat as well as such cells adapted to minimize heat waste from other cells in all combinations of such cells.

In other aspect of the invention, another object is to provide new and useful methods and apparatus for treating fluid in the generation of hot fluid, which utilize the heating source for circulation of fluid through vertical tube heat exchange means in one or more heating cells including a combustion chamber defined by the heat exchange tubes and preferably having its peripheral wall constructed of vertical heat exchange tubes.

In still other aspects of the steam generation cells provided herein, variations of the apparatus may include the provision of such features as the use of a plurality of heat exchange walls, e.g. two heat exchanger walls each defining the peripheral limits of a combustion gas heating chamber; the preferable arrangement of heat exchange tubes in annular array providing the preipheral walls of the combustion chamber; the adaptation of the combustion chamber as a furnace by association of fuel burning means therewith, preferably adjacent one end of a wall of heat exchange tubes; the use of means for compensating, at least in part, for expansion of water during circulation and heating; free-flow of water upward through the heat exchange tubes without reverse in flow direction, e.g. as would occur with reverse bends in the tubes; the adaptation of the wall formed of heat exchange tubes or provision of means defining a flow path through the wall for passage of combustion gases from one chamber to another for series flow, the flow path preferably being adjacent the opposite end of the wall from the introduction of combustion gases; and vertical flow or direction of combustion gases, e.g. alternate upward and downward or downward and upward flow, through heat exchange chambers, including the combustion chamber.

In a preferred arrangement of this invention, the heat exchanger tubes may be generally straight tubes, with the exception of slightly bent tube ends, providing less flow resistance for optimum circulation and may also be of the same size or configuration so that flow through each tube is at approximately the same rate, thereby decreasing the possibility of short circuiting or more rapid circulation in one tube than in another, while at the same time providing economy in construction due to the usual relatively lower cost of straight tubes.

Still other objects and features will become apparent from the following detailed description taken in connection with the accompanying drawings, in which:

FIGURE 1 is a perspective view of an embodiment of a multi-cell steam generator in accordance herewith with cutaway portions to show internal structure;

FIGURE 2 is a vertical section through a generator cell of the system of FIGURE 1 taken generally along line 2—2 of FIGURE 1 showing internal construction of the cell and associated apparatus.

FIGURE 3 is a horizontal section through the cell of FIGURE 2 along line 3—3 of FIGURE 2;

FIGURE 4 is a perspective view of a modified embodiment of a steam generator cell broken and cut away for convenience of illustration and for the purpose of showing internal construction;

FIGURE 5 is a perspective view of another embodiment of a multi-cell steam generator with parts removed and cut away for clearer and more detailed illustration.

Figure 6:
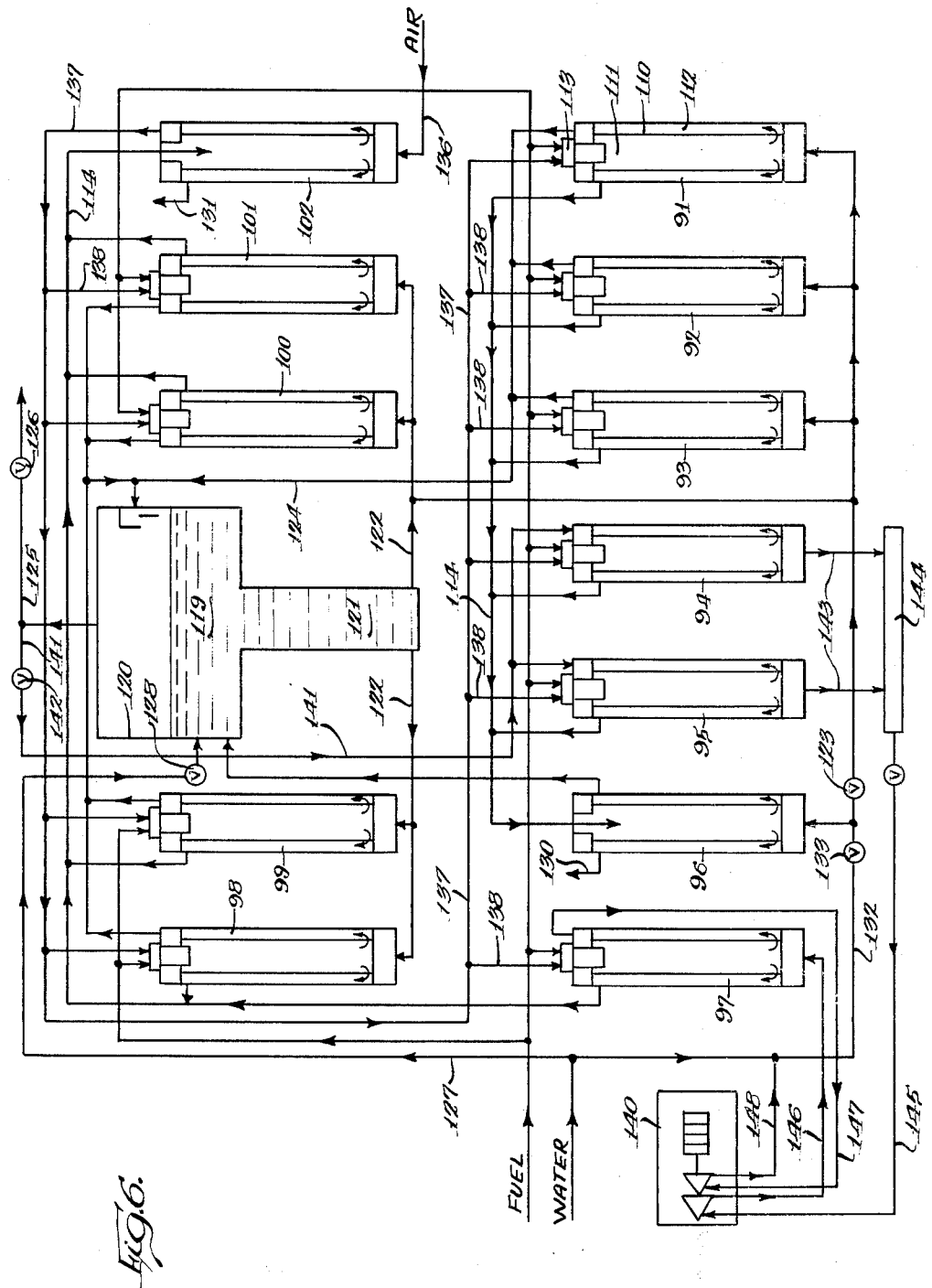
FIGURE 6 is a flow diagram of the system of FIGURE 5.

While this invention is susceptible of embodiment in many different forms, there is shown in the drawings and will herein be described in detail embodiments of the invention or modifications thereof with the understanding that the present disclosure is to be considered as an exemplification of the principles of the invention and not intended to limit the invention to the embodiments illustrated or described in detail.

Referring first to FIGURES 1–3, there is provided as an embodiment of the present invention, a multi-cell steam generator utilizing a plurality of cells, illustrated as three cells 11, 11a and 11b mounted and supported on suitable framework (not shown). The three cells are in cooperative association with a water storage steam separator indicated generally at 10, also supported on suitable framework (not shown), for continuous generation of steam by circulation of water from tank 10 through each of the cells for heating of the water and returning it to tank 10.

The cell indicated generally at 11 is a hot water or steam generator cell and includes a casing 12 having an annular array of heat exchange tubes 13 vertically supported therein. The array of tubes defines an inner chamber 14 and separates the inner chamber from an outer chamber 15. A lower end plate 16 is peripherally secured to the interior of casing 12 and receives the ends of tubes 13 for communication of the open tube ends with a water manifold 17. An upper annular ring-shaped end plate 18 receives the upper open end of tubes 13 for communication of the tube interiors with water or steam manifold 19. The space between staggered tubes 13 is filled and sealed, e.g. with refractory material 20, adjacent end plate 18. Tubes 13 are supported by disc-shaped end plate 16 and ring-shaped end plate 16 and ring-shaped end plate 18.

The annular array of tubes 13 provides a gas-tight wall and separates chambers 14 and 15 as separate gas passages. For this purpose, between each of the tubes in the annular array there may be a continuous longitudinal seal weld vertically providing a joint between the water tube risers. The vertical weld or gas-tight joint is illustrated generally at 21. At their lower ends, the tubes 13 are spread from their gas-tight association as illustrated at 22 to provide a flow path or gas passage between chambers 14 and 15 only at the lower end of the annular array. Also, at the lower end of casing 12 an openable covered manhole 23 is provided for access to manifold 17 for removal of sediment and the like therefrom and for servicing, e.g., cleaning tubes 13.

Water storage and steam separation tank 10 is provided with a plurality of outlets such as outlet 26, one or more outlets for each of cells 11, 11a and 11b. A conduit such as pipe 27 extends from outlet 26 to inlet 28 in manifold 17 for directing water under circulation from tank 10 to manifold 17. Manifold 19 is provided with a pair of outlets 29 and conduits such as pipes 30 connect outlets 29 with inlets 31 of tank 10. Baffles are provided to direct fluids downward entering inlets 31 disposed above the normal water level in tank 10.

Tank 10 is constructed of a cylindrical shell 35 which is pressurizable and capable of containing fluid under pressure. An overhead vat conduit 36, which may be valved if desired, is provided for withdrawal of the steam from shell 35. Makeup water is supplied to the multi-cell unit by means of water supply pipe 37 which is connected with shell 35 for supply of water to the tank or to manifold 17b of cell 11b for preheating within cell 11b. Suitable valving is illustrated. The withdrawal of steam or hot water, pressure of the unit, and the like, may be controlled from the control panel 38. For this purpose, and for the purpose of servicing the upper end of the unit, and especially the burners in the individual cells, a handrailed operator's platform 39 is provided. The platform is also secured to suitable framing (not shown).

At the top of cell 11, burner 41 is provided as a source of heat exchange fluid. Burner 41 is a gas burner and is supplied with fuel through gas feedline 42, and with air through line 40. The burener nozzle is formed by a cylindrical downward extension of the casing at 43 which projects into chamber 14. Chamber 14 is actually a combustion chamber with burning of gases being accomplished therein and thus, in combination with burner 41, comprises a furnace.

By way of example, cell 11 may be an appropriately 20,000 pound steam generator. Burner 41 is adjusted for a burning rate at about 24,000,000 B.t.u. per hour input gas. Casing 12 has a diameter of about 30 inches and is constructed of light plate steel and may be insulated, e.g. with a 2 inch fiberglass blanket with sheet metal lagging thereover. The water tube risers are about 30 feet long and may include, for example, 2 inch diameter water tube risers for the top 10 feet of length, 1½ inch diameter water tube risers in the center section for 10 feet of length and 1¼ inch diameter water tube risers in the lower 10 feet of length. Thus, the inner diameter of the water tubes increases upwardly. Such increase in diameter is for the purpose of accommodating, at least in part, the expansion of water into steam within the risers.

Unit 11a is another 20,000 pound steam generator of the same construction as unit or cell 11, in parallel flow with respect to water flow with unit 11. Additionally, any number of generators can be added to further increase capacity of the multi-cell system. Both, or either of units 11 and 11a may be used at one time as desired. It may be advantageous to provide valves on the exhaust manifolds adjacent each unit to prevent backup of flue gases in a unit when not in use.

Unit or cell 11b is an economy cell designed to utilize flue gases exhausted from units 11 and 11a. The purpose of unit 11b is to recover heat in that the flue gases are still sufficiently hot when exhausted from the generator units 11 and 11a to be advantageously employed for further heating of water circulated from tank 10. Unit 11b may also be used to preheat water charged to manifold 17b through supply line 37, depending on the positioning of valves 37a. Unit 11b is otherwise of the same construction as units 11 and 11a except that the burner is omitted and in lieu thereof the exhaust gases from exhaust manifold 44 are directed into the inner chamber 14b of unit 11b from the top thereof. For this purpose, exhaust gas conduit 45 withdraws gases from the exhaust manifold upstream from a barrier 46 across the exhaust manifold so that all exhaust gases from the upstream units are diverted through unit 11b for heating water therein. The exhaust gases are then discharged into manifold 44 on the downstream side of barrier 46. With the exception of this change in source of combustion gases for heating water within the unit, flow through unit 11b is the same as through unit 11.

In operation of unit 11, with tank 10 filled to a water level such as is shown in FIGURES 1 and 2, ignition of burner 41 is accomplished in conventional manner and fuel gases from feedline 42 are burned in the presence of air from air duct 40 within nozzle 43 and combustion chamber 14. The hot combustion gases are passed downwardly through chamber 14 in heat exchange with water in tubes 13. At the bottom of chamber 14, the gases pass through the flow path provided by the spreading of tubes at 22 and then pass upwardly through outer annular chamber 15 again in heat exchange with water in tubes 13. The combustion gases are exhausted to exhaust manifold 44. As a result of passage of the hot combustion gases, the water in tubes 13 is heated and circulated upward by convection currents established therein. The water circulates through manifold 19, conduit 30 and into tank 10 carrying heavy steam produced within tubes 13 into tank 10. Water is drawn downward through conduit 27 to manifold 17 and into the lower ends of tubes 13 for heating. A continuous cyclic flow of water from the tank through the heat exchanger and back to the tank is mantained by the convection currents and difference in weight between the water in conduit 27 and the water and steam mixture in tubes 13. In addition, the positioning of tank 10 with its water level above the tubes 13 provides hydrostatic pressure supplementing the circulation.

Turning now to FIGURE 4, there is illustrated a structure in the form of cell 50 which is much like cell 11, except that cell 50 illustrates the use of two annular rings or walls of heat exchange tubes wherein each chamber has walls defined by vertical heat exchange tubes. Cell 50 is a vapor generator cell. In generator cell 50 there is also illustrated the use of a burner for introducing combustion in the combustion chamber from the bottom thereof with the burner disposed laterally therefrom. In generator cell 50, the housing for the cell is composed of a steel plate casing 51 providing most of the structural support, a layer of insulating material 52 and an outer sheet metal lagging covering 53. Within casing 51 and adjacent the inner walls thereof there is disposed an annular ring of vertical heat exchange tubes 54 which comprises an outer wall of tubes interconnected by joining plates 55 welded between tubes and extending the length of the tubes to isolate the space within the annular array from casing 51 over the length of the tubes. Within the outer array of tubes is an inner annular array of tubes 56 which are welded together providing gastight seals or joints as indicated at 57. An inner chamber 58, serving as the combustion chamber, is enclosed by the inner annular wall of tubes 56 and between the wall of tubes 56 and the wall of tubes 54 is located the outer annular chamber 59. Tubes 56 are spread at the top of the inner annular wall as shown generally at 60 to provide a flow path between chambers 58 and 59. Generator cell 50 is supported by legs 61 and feet 62.

The water storage tank and steam separator is an insulated tank indicated generally at 65. Tank 65 is equipped with a flanged outlet conduit 66 for withdrawal of vapor such as live steam from tank 65. Flanged outlet 66 can readily be associated with other conduits and piping for direction of withdrawn vapor as desired. Such associated conduits may conveniently be provided with valves for maintaining pressure in tank 65. Tank 65 is also provided with pressure relief valves 67 which are safety valves preventing overpressuring of the tank. Liquid, such as water, can be charged to tank 65 by means of valved makeup line 68.

Liquid is initially supplied to tank 65 by means of valved line 68, and during operation of the unit, makeup liquid is also supplied by line 68 to compensate for conversion of liquid to vapor and withdrawal of vapor through outlet 66. Steam drum or separator 65 can be of a sufficient size to accommodate a plurality of generator cells, e.g. of the same design as cell 50.

A conduit 70, having insulation 71 disposed thereabout, extends from an outlet in the bottom of tank 65 to the water intake manifold 72 of the generator cell. Conduit 70 and tank 65 are supported by a support means such as leg 73 and foot 74.

Heat exchange tubes 54 and 56 extend through lower end plate 75 and upper end plate 76 and are anchored thereto for communication with lower intake manifold 72 and upper water outlet manifold 78. Water or steam return conduits 79 are provided for conducting the generated hot water or steam to separator tank 65 for separation of steam from the water and for withdrawal of live steam through outlet 66. Plate 75 and manifold 72 are both of annular configuration.

At the bottom of the generator cell, burner 81 is disposed laterally. Fuel gas may be fed to burner 81 by means of feedline 82 and the feed of fuel gas may be controlled by a control valve such as control valve 83. Air duct 85 is provided for supplying the air to burner 81. Burner 81 extends into combustion duct 86 which, in turn, extends through the central passage in annular plate 75 and manifold 72 and into combustion chamber 58.

In operation, burner 81 is ignited by conventional means with valve 83 open for supply of gas through line 82. Air is drawn in through duct 85 and the flame of combustion is directed through duct 86 into furnace chamber 58 causing an upward flow of combustion gases therein and through flow path 60 and then in a downward direction through outer chamber 59 for exhausting through flow path 87 provided by spreading of the outer array of heat exchange tubes and manifold 88 to exhaust duct 89. The water heated within tubes 54 and 56 rises through chamber 78 and conduit 79 to tank 65. Steam also rises. The convection currents and fluid weight difference of solid liquid in conduit 70 and liquid-vapor in tubes 54 and 56 set up a cyclic flow of water from tank 65 downward through conduit 70, thence upward through tubes 54 and 56 and conduit 79.

With reference to FIGURES 5 and 6, there is illustrated a system embodying a plurality of heating cells 91 through 102 in annular array about a central tank 120. Tank 120 is provided for storage of water and separation of steam. Cells 91 through 94 and 99 through 101 are boiler cells. Cell 97 is usable as a reheating cell and cell 95 is a superheating cell. Cell 96 is an economy cell utilizing the combustion gases exhausted from the cells 91 to 95 for the purpose of preheating feed water. Cell 102 is an air heater cell in which exhaust gases from cells 97 to 101 are passed in heat exchange with air to preheat air for use in burners 113.

Each of the cells 91 through 102 includes an annular array of vertically disposed heat exchange tubes 110 defining an inner chamber 111 and an outer chamber 112. The array of cells is supported by support means indicated generally at 104. Each cell except cells 96 and 102 is provided with a burner 113 disposed at the upper ends thereof and directing gas combustion down into combustion chamber 111. The annular array of tubes is spread adjacent the lower end of chamber 111 and the gases pass through as described hereinabove and travel upward to chamber 112 and are exhausted into exhaust gas manifold 114.

Water is supplied to tank 120 as desired or needed by means of water conduit 127 and control valve 128. A body of water 119 is maintained within the tank at all times between operation of the stream generator. The water flows downward through a central extension through 121 of tank 120 and through individual feeder lines represented at 122 provided for each of the cells 91 through 101. Feeder line 122 of cell 96 is valved at 123 for control of flow of water to the cell from tank 120.

Each cell having a burner 113 is placed in operation merely by ignition of the burner. The heated water flows as described above by convection currents upward through tubes 110 and is discharged via conduit 124 as steam or hot water into pressurized tank 120. The colder water flows downward through extension 121 for distribution to the cells. Steam is withdrawn from tank 120 thru line 125, which is controlled by pressure control valve 126.

The economy cell 96 operates as a feed water preheater. Exhaust gases from hot gas duct 114 are charged through the central combustion chamber 111 of cell 96 and are withdrawn from the outer chamber 112 of the cell and vented through vent 130. The feed water is charged to the tubes 110 of cell 96 through the manifold below the lower tube plate via lines 127 and 132 as controlled by valve 133 with valve 128 closed. Valve 123 may be either open or closed depending on whether reheating of water from tank 120 is also desired. Where it is desired to use cell 96 solely for reheating water in tank 120, valve 133 is closed and valve 123 is opened. Makeup of supply water may then be charged through line 127 and valve 128 as described above.

Air heater cell 102 serves to preheat air for supply to burners 113 of cells 91–95 and 97–101 for more efficient combustion in burners 113. Accordingly, air is drawn in through duct 136 into the lower tube manifold and passed upward through the heat exchange tubes and is withdrawn from the upper tube manifold through duct 137. While in the tubes, the air passes in heat exchange with exhaust gases from other cells diverted through the inner and outer chambers of cell 102 in the same manner explained with respect to unit 96. The exhaust gases are then vented through duct 131. The resulting heated air is withdrawn from duct 137 through ducts 138 for use in individual burners 113.

The superheater cells 94 and 95 are similar to the boiler cells. The superheater cells may advantageously be used to produce superheated steam, e.g. for use in steam turbine 140 or elsewhere. The superheater cells are fired by burners 113 and steam is withdrawn from tank 120 via conduit 141 controlled by valve 142 and the steam is charged to the upper tube manifold for flow downward through the tubes and for withdrawal from the superheater cell through line 143. The withdrawn resulting superheated steam, after passage through either or both of units 94 and 95 is collected in a superheated steam manifold 144 which is used to supply superheated steam as required through valve line 144, e.g. to turbine 140. Of course, the superheated steam may be used for any purposes desired.

A reheater cell 97 is also provided in the flow system and may be used to quickly reheat steam to usable temperature. For example, steam withdrawn from an intermediate stage of turbine 140 through line 146 is charged to the lower tube manifold of reheater 97 and passes upward through the heat exchange tubes in the same manner as in the boiler cells. The resulting reheated steam is reconducted by line 147 to an intermediate turbine stage of turbine 140 for use in driving the intermediate stage. Steam and/or water from the last turbine stage may be vented or may be discharged to water feed line 127 or 132 by means of line 148.

The system of FIGURES 5 and 6, for example, may originally be constructed, if desired, with only a few cells and cells may later then be added as needed or desired to make up the complete annular complement of cooperating cells coordinated by preselection to perform a given task in combination with the storage and separation tank to generate and maintain a desired amount of steam at a desired specific temperature or range of temperatures or pressures.

Although the system of FIGURES 5 and 6 has included one air heater, one reheater, one economizer, two superheaters and seven boiler units, it is apparent that any number of air heaters, economizers, reheaters, superheaters and boiler units can be included in a given combination in any proportion to each other as desired or required. Further, one or more of the various types of units may be omitted completely from a system. In a preferred embodiment, it is an advantage that one basic unit design may be used for a plurality of functions in various systems. As another advantage, each unit can be constructed for a high capacity, e.g. hundreds of thousands of pounds, and the units lend themselves readily to factory assembly in almost any desired size. For example, a two-hundred-thousand pound unit or plurality of such units may be fabricated of such size, e.g. eight feet in diameter and sixty feet in height, for convenient transportation via railroad flat car. The storage tank can also be fabricated, either as a unit or in sections for assembly, of a more readily transportable size.

I claim:

A multi-cell system for generating steam which comprises an elevated water storage tank having a plurality of inlets and a central restricted downward extension of said tank having a plurality of outlets, said central extension comprising a support member for said tank; a plurality of vertical tube heat exchanger cells disposed in annular array about said tank and in parallel flow with respect to water passed therethrough for heating therein, each of said heat exchanger cells comprising a separate housing, a vertical annular array of generally straight heat exchange tubes in the housing defining separate inner and outer chambers, means for producing hot combustion gases in one of said chambers, means directing hot combustion gases through said chambers, inlet means for introducing liquid to be heated to the lower ends of said tubes, separate conduit means for directing said liquid from an outlet of said tank to said tube inlet means, outlet means permitting flow of heated liquid from the upper ends of said tubes, and separate conduit means for directing heated liquid from said tube outlet means back to said tank, said hot combustion gases producing means being capable of producing combustion gases of a temperature sufficient to heat water in said tubes and effect cyclic circulation of water from said tubes to said tank and back to said tubes by convection currents; means for withdrawing steam from said storage tank; and an accessible raised platform generally coextensive with said array of heat exchangers adjacent the upper ends thereof and from which the upper ends of the heat exchangers are accessible for servicing.

References Cited by the Examiner
UNITED STATES PATENTS

| | | | |
|---|---|---|---|
| 348,932 | 9/86 | Rugg | 122—240 |
| 408,708 | 8/89 | Gordon et al. | 122—343 |
| 1,223,108 | 4/17 | Radiguer | 122—235 |
| 2,818,838 | 1/58 | Throckmorton et al. | 122—356 |
| 2,909,158 | 10/59 | Arnold et al. | 122—421 |
| 2,968,288 | 1/61 | Zoschak et al. | 122—240 |

FOREIGN PATENTS

| | | |
|---|---|---|
| 1,107,078 | 8/55 | France. |
| 447,200 | 2/26 | Germany. |
| 24,023 | 1899 | Great Britain. |

PERCY L. PATRICK, *Primary Examiner.*

MEYER PERLIN, *Examiner.*